United States Patent [19]

Hayden

[11] Patent Number: 4,948,298

[45] Date of Patent: Aug. 14, 1990

[54] PROCESS FOR RESTORING CHANNELS THREATENING TO COLLAPSE, IN PARTICULAR PROFILED CHANNELS

[75] Inventor: Rudolf Hayden, Altmünster, Austria

[73] Assignee: Allgemeine Baugesellschaft-A. Porr Aktiengesellschaft, Vienna, Austria

[21] Appl. No.: 124,854

[22] PCT Filed: Mar. 2, 1987

[86] PCT No.: PCT/AT87/00014

§ 371 Date: Nov. 3, 1987

§ 102(e) Date: Nov. 3, 1987

[87] PCT Pub. No.: WO87/05365

PCT Pub. Date: Sep. 11, 1987

[30] Foreign Application Priority Data

Mar. 3, 1986 [AT] Austria .................................. 547/86

[51] Int. Cl.$^5$ ............................. E03F 3/06; F16L 1/00
[52] U.S. Cl. ....................................... 405/154; 138/97; 405/155
[58] Field of Search ............... 405/150, 154, 155, 184; 138/97, 105

[56] References Cited

U.S. PATENT DOCUMENTS 4,728,223  3/1988  Rice ...................................... 405/154

FOREIGN PATENT DOCUMENTS

| 213343 | 2/1961 | Austria . |
| 213791 | 2/1961 | Austria . |
| 307326 | 5/1973 | Austria . |
| 0110664 | 6/1984 | . |
| 0146331 | 6/1985 | European Pat. Off. . |
| 3408461 | 9/1985 | Fed. Rep. of Germany . |
| 794077 | 8/1935 | France . |
| 801924 | 8/1936 | France . |
| 2079805 | 1/1982 | United Kingdom . |
| 2081281 | 2/1982 | United Kingdom . |
| 2139938 | 11/1984 | United Kingdom . |
| 2167796 | 6/1986 | United Kingdom . |

OTHER PUBLICATIONS

Dr. Alfred Pauser, "Unterirdische Kanal Sanierung", pp. 93–97, published by Springer-Verlag Wien (1988).

*Primary Examiner*—David H. Corbin
*Attorney, Agent, or Firm*—Spencer & Frank

[57] ABSTRACT

The present invention proposes a process for the rehabilitation of sewers that are in danger of collapsing, in particular profile sewers, by the use of a ground stabilizing technique, in which a dense inner shell is introduced into the damaged sewer, the damaged sections of the sewer wall are loosened and/or removed from outside by the use of a cutting jet of water or suspension, with or without added air, and the resulting or existing space is filled and stabilized with mortar and/or suspension. This process is universally applicable, presents no technical difficulties, and results in an economical and durable renovation of damaged sewers.

20 Claims, No Drawings

PROCESS FOR RESTORING CHANNELS THREATENING TO COLLAPSE, IN PARTICULAR PROFILED CHANNELS

BACKGROUND OF THE INVENTION

The present invention relates to a process for rehabilitating sewers that are in danger of collapsing, in particular profiled sewers.

Thousands of kilometers of sewers have existed, unnoticed, for decades beneath heavily travelled traffic surfaces. For some time now, the state of many sections of these underground arteries has made reconstruction and renovation a matter of urgency. In the area of Vienna alone there are some 450 kilometers of profile sewers which, in the opinion of experts, are either leaky or else in danger of collapsing. However, conventional repairs would require an unreasonable amount of additional excavation work, and so it is essential to develop construction methods that will make it possible to perform all the work without any major disruption of life "on the surface."

With regard to the causes of damage and the overall picture of such damage, one has to proceed from the fact that each sewer is subjected to loads that act on it externally as well as loads that act on it internally. External loads are those caused by ground burden, traffic loads, lateral ground pressure resulting from shifting caused by excavations or explosions (aerial bombs) in adjacent areas, settling, and other factors. Internal factors are those such as erosion of the bottom by debris, various types of corrosion caused by aggresive waste water and vapours. The combined effect of all these factors——exacerbated in some cases by deficiencies in planning and execution——leads to the fact that the sewer becomes progessively damaged until it is in need of repair, and has to be renovated. Very frequently today, the spectrum of loads has changed completely relative to the conditions that existed at the time the original work was carried out. Even though ongoing maintenance operations are carried out at many places throughout the sewer network, many areas have become obsolete. If one inspects the sewers to determine their condition or to find visible damage, one is confronted by a very varied and complex picture of the damage that is present: cracks and fissures in the walls, partial or complete erosion of the bottom, loose joints in the masonry, changes in gradients due to subsidence, damaged inflows (disemboguements) and manhole connections, deformation of the profile, and so on. The extraction of core samples provides information about the overall cross-section of the walls and permits one to draw conclusions about the strength of the sewer structure, insofar as this cannot be done from the picture presented by existing damage.

In a sewer that has become damaged in this way, the question of reconstruction or renovation then arises. Whereas, as a rule, reconstruction only provides a temporary solution, renovation or rehabilitation must ensure full functional capacity of the sewer for many decades. This will affect the costs, which will have to be estimated for the construction measures in each case.

The object of all sewer reconstruction must be to reestablish the solidity of the sewer and its resistance to chemical attack. The measures will perforce depend on the shape and size of the sewer cross-section. Much will depend on; whether or not there is room to work within the profile, whether or not equipment will have to be used from shafts, whether or not the existing cross-section is to be retained or enlarged, and whether or not a reduction of the cross-section is acceptable. The causes of existing damage and the picture of existing damage supplement the technical parameters, so that in the final analysis, when economic considerations are also factored in, reaching a decision in favour of a particular reconstruction process can be extremely difficult.

If a slight reduction of the profile is acceptable and there is sufficient working space available, the surrounding ground can be consolidated stability (steadiness with regard to shock and vibration) can be increased by using (cement) injection and the sewer walls can be repaired by using reconstruction products (mainly using a cement-plastic base). The cleaning of the inside walls of the sewer which is required for this is, in most instances, rendered extemely difficult by the presence of a hard layer of sewer scale, which reduces or prevents adhesion of the reconstruction layers that are installed. This also applies in the case of sprayed concrete coatings. Thus, it is essential to reinforce these and build them up to be self-supporting pipes.

A pipe is also formed in the same way in the case of smaller——slippable——profiles, this being done by using an inner shell of steel or in the form of a tube. The sole of this pipe can be of prefabricated plastic-cement skinning. In the case of circular profiles, it is possible to use thin-wall plastic pipe (e.g., PVC or PE), when the remaining intervening space between the new and the old sewer is filled with cement suspension.

When these processes are used, difficulties are caused by the inflow junctions from domestic connections, insofar as these are not fed in through shafts.

Finally, there are procedures in which components of plastic, glass-reinforced plastics, or fibre cement are used to produce a new profile in situ. These require an appropriate amount of working space and, for this reason, are suitable only for larger cross-sections.

The renovation of a sewer can also be done when there is a need to increase its capacity and cross-section. Here, the pipe-advance method is available which makes it possible to advance in two directions from a shaft, so that a shaft is needed for every 200 to 300 meters of sewer. This method is restricted to circular cross-sections and the pipes are advanced through the existing sewer, which is then dismantled section by section. The high level of technical expenditure results in high costs, so that this method must be confined to special cases.

Especially worthy of note are reconstruction methods that employ modern plastics technology. They involve the (mechanical) production of a pipe in the existing profile. The pipes are self-supporting and bonded by artificial resin. As far as is known, this technique is presently only in the testing stage.

In summary, all formerly known and used methods of reconstructing damaged sewers can only be used in certain areas when the damage is not too great. As a rule, the associated costs are extremely high and only offer the possibility of a permanent improvement in a few cases.

Thus, there is still a need for a reconstruction method that is as far as possible universally applicable for repairing damaged sewers, which provides an economical and permanent renovation of damaged waste water lines and which provides the greatest possible continuation of sewer operation, with only slight inconvenience to adjacent properties and the briefest disruption of vehicular traffic.

SUMMARY OF THE INVENTION

This objective can be achieved by the process according to the present invention for the rehabilitation of damaged, accessible slippable and non-slippable sewers of any cross-section. In the method of the invention an impermeable inner shell is introduced into a damaged sewer, after which the damaged wall sections are loosened and/or removed with the help of a cutting jet of water or suspension, with or without added air, and the resulting or pre-existing spaces are filled and stabilized with mortar and/or suspension.

It is preferred that a thermoplastic, an elastomer or a pressure-setting bonding agent be used as the mortar or the suspension, respectively. Other preferred filling materials are hydraulic bonding agents such as Portland cement, iron Portland cement, Portland blast furnace cement, cement with increased resistance to sulfate, lime, quick-setting cement based on 11 CaO.7Al2O3-.CaF2 and high-alumina cement. In a more advantageous further version of the process according to the present invention, suitable additives can be used to match the hardening time of the cement to the given conditions. The addition of a liquifying agent, a thinner, a porosity agent and/or a stabilizer can result in further, required improvements and modifications.

An improvement in the penetration characteristics and/or the durability of the mortar and/or suspension can be achieved by the addition of plastic additives, preferably based on acrylate and/or styrol butadiene.

According to a preferred variation of the process, a steel shell serves as the inner shell, this preferably being made of dismantleable steel shells. It is preferred that this be installed on prefabricated sole plates. As the shell is assembled section by section, it is expedient that lagging or lining elements for the new sewer be installed around the shell.

If desired, rows of hydraulic presses can be arranged along the joints between the sections of the shell that is is introduced into the sewer, such that when they are operated, the shell is expanded, pressed against the walls of the sewer, and the joints in the sewer wall are loosened and/or destroyed.

By way of example, the sequence of operations for the process according to the present invention can be as follows:

In order to be able to carry out the appropriate work on the sewer, a wear-resistant and impermeable shell is installed within the existing sewer profile. This shell not only supports the sewer during the high-pressure, washing and injection operations, but also imparts a smooth inside surface to the newly constructed stabilizing body around the sewer. A pipe is installed in the shell so as to provide for the temporary runoff of waste water into the sewer that is to be reconstructed.

Depending on ground conditions, after boring to the required depth, a shaft is sunk. The drill head at the lower end of the bore rods is fitted with a special valve in which there is one or a plurality of nozzles that are arranged orthogonally to the axis of the drill. The unworked ground and the damaged sections of the sewer wall, as well as the very solid sewer encrustation, are cut out and removed and washed out with the help of a cutting jet of water or suspension, with or without added air. The pump pressure is adjusted so that this procedure can be carried out to a sufficient extent. Depending on the ground characteristics and the characteristics of the sewer wall, a pump pressure of 5 to 1000 bar, preferably from 25 to 800 bar, and in particular from 100 to 500 bar, can be used. Under particularly difficult conditions, it may even be necessary to use a pump pressure of up to 1300 bar.

The loosening and/or removal of the canal wall sections surrounding the inner shell and/or the bottom areas can be effected with the help of conventional high-pressure injection systems such as, for example, "Soilcrete Jet Grouting"/GKN Keller or "Grout Jetting"/Hoerlesberger.

The suspension or the mortar, respectively, is injected at high pressure through the drill rods during the withdrawal of the drill head.

By directing the injection stream in a specific direction for a specific time it is possible to establish the shape and the dimension of the stabilization. The washed-out ground is replaced by the cement suspension, which mixes very thoroughly with the loosened ground to form a homgeneous ground mortar. This is particularly easy to carry out, because the area the washing out and the stabilization takes place in is what was the backfill zone for the sewer.

Compared to formerly known processes for reconstructing damaged sewers, the process according to the present invention offers, above all else, the advantage that it is universally usable and entails no technical difficulties. It is characterized by particular economy and is environmentally benign, since only environmentally safe materials are used. Noise is kept to a minimum, since all the mechanical systems are accommodated in acoustically damped housings. In addition, there is the fact that the construction work can be confined to night-time hours, and even in confined spaces, does not disrupt the neighbouring economy.

I claim:

1. A process for the rehabilitation of damaged, accessible, slippable and non-slippable sewers of any cross-sectional shape, comprising the steps of:
   introducing an impermeable inner shell into the damaged sewer;
   loosening the damaged sections of the sewer wall by a liquid cutter jet; and
   filling and stabilizing the spaces between said inner shell and said sewer wall with at least one filling material selected from the group consisting of mortars and suspensions.

2. The process as set forth in claim 1, wherein said filling material comprises a hydraulically hardening mortar.

3. The process as set forth in claim 1, wherein said filling material comprises a quick-hardening cement based on $11CaO-7Al_2O_3-CaF_2$.

4. The process as set forth in claim 1, wherein said filling material is selected from one of the group consisting of a thermoplastic, an elastomer and a pressure hardened organic bonding agent.

5. The process set forth in claim 1, wherein said filling material contains an additive to adjust the hardening time of filling material to the particular conditions.

6. The process as set forth in claim 1, wherein said filling material contains at least one additive selected form the group consisting of a liquifying agent, a thinner, a porosity agent and a stabilizer.

7. The process as set forth in claim 1, wherein said filling material contains a plastic additive based on at least one of acrylate and styrol butadiene to improve at least one of the penetration performance and the durability of said filling material.

8. The process as set forth in claim 1, wherein said cutter jet operates at a pump pressure of about 5 to 1000 bar.

9. The process as set forth in claim 1, wherein a steel shell is used as the inner shell.

10. The process as set forth in claim 1, wherein the inner shell is installed on prefabricated base shells.

11. The process as set forth in claim 1, wherein section by section as the shell is assembled, lining elements.

12. The process as set forth in claim 1, where said shell is comprised of segments and joints therebetween and said process further comprises the step of arranging rows of hydraulic presses along the joints between segments of the shell introduced into the sewer, such that when said presses are operated the shell is expanded, pressed against the wall of the sewer, and the joints in the sewer wall are opened up and destroyed.

13. The process as set forth in claim 1, wherein said loosening step further comprises removing said damaged sections of said sewer wall.

14. The process as set forth in claim 1, wherein a water cutter jet is used in said loosening step.

15. The process as set forth in claim 1, wherein a suspension cutter jet is used in said loosening step.

16. The process as set forth in claim 1, wherein said cutter jet includes added air.

17. The process as set forth in claim 1, wherein said filling material comprises at least one mortar based on of the group consisting of a Portland cement, an iron Portland cement, Portland blast furnace cement, a cement with increased resistance to sulfate, a quick-hardening high alumina cement, and a hydraulically hardening lime.

18. The process as set forth in claim 1, wherein said cutter jet is at a pump pressure of 25 to 800 bar.

19. The process as set forth in claim 18, wherein said cutter jet is at a pump pressure of 100 to 500 bar.

20. The process as set forth in claim 1, wherein said inner shell is a dismantleable steel shell.

* * * * *